(No Model.)
J. P. SMITH.
DROP CURTAIN.
No. 379,614. Patented Mar. 20, 1888.
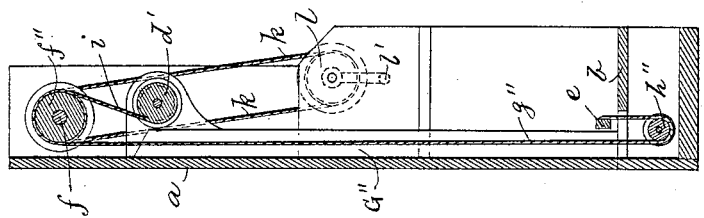
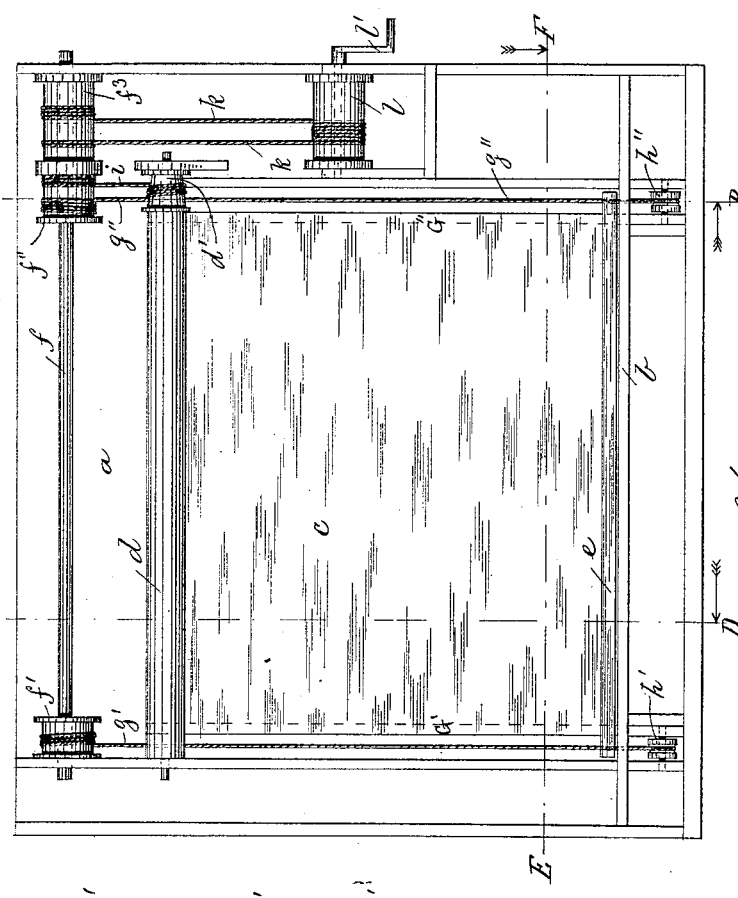
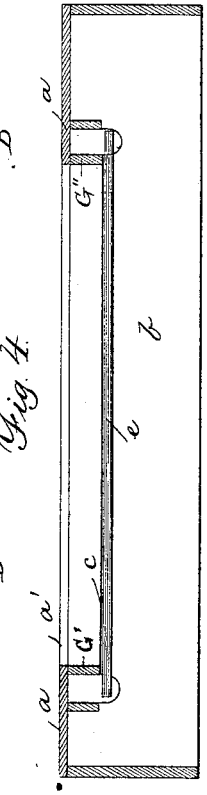
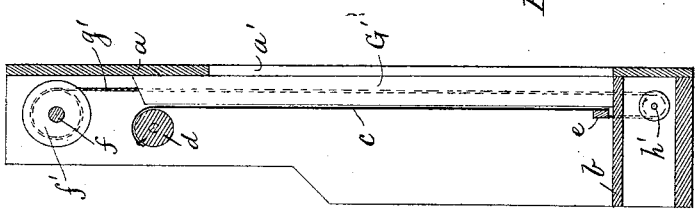
Witnesses.
H. L. Chapin.
Henry Chadbourn.
Inventor.
John P. Smith.
by Alban Andrew.
his atty.

UNITED STATES PATENT OFFICE.

JOHN P. SMITH, OF EXETER, NEW HAMPSHIRE.

DROP-CURTAIN.

SPECIFICATION forming part of Letters Patent No. 379,614, dated March 20, 1888.

Application filed January 3, 1888. Serial No. 259,679. (No model.)

*To all whom it may concern:*

Be it known that I, JOHN P. SMITH, a citizen of the United States, and a resident of Exeter, in the county of Rockingham and State of New Hampshire, have invented new and useful Improvements in Drop-Curtains, of which the following, taken in connection with the accompanying drawings, is a specification.

This invention relates to improvements in drop-curtains for theaters, public halls, and similar purposes, and it is carried out as follows, reference being had to the accompanying drawings, wherein—

Figure 1 represents a rear elevation of the invention. Figs. 2 and 3 represent vertical sections on the lines A B and C D, respectively, as indicated in Fig. 1; and Fig. 4 represents a horizontal section on the line E F shown in Fig. 1.

Similar letters refer to similar parts wherever they occur on the different parts of the drawings.

$a$ represents the proscenium-wall, having the opening $a'$, in the usual manner.

$b$ represents the stage-floor, as usual.

$c$ represents the curtain, the upper end of which is secured to the roller $d$, the latter having its ends journaled in bearings secured to the proscenium-wall or other stationary object.

$e$ is a light slat or bar secured in a suitable manner to the lower edge of the curtain $c$, as shown.

Above the curtain-roller $d$ is located a shaft, $f$, that is journaled in bearings secured to the proscenium-wall or other stationary object, as shown in Figs. 1, 2, and 3. To said shaft $f$ are secured the drums $f'\ f''$, to which are secured, respectively, the ropes or chains $g'\ g''$, which are guided around grooved pulleys $h'\ h''$, the shafts or spindles of which are journaled or located below the stage-floor $b$, as shown in Figs. 1, 2, and 3. The lower ends of said ropes or chains $g'\ g''$ are secured in a suitable manner to the bar $e$ at or near its ends, as shown.

The object of the drums $f'\ f''$, ropes or chains $g'\ g''$, and pulleys $h'\ h''$ is to pull the curtain down when the shaft $f$ and said drums are rotated in one direction, and I am thus enabled to dispense with the heavily-weighted bar or roller usually attached to the lower portion of theater or similar curtains.

To the drum $f''$ is also secured one end of a rope or chain, $i$, the other end of which is wound upon and secured to a drum or roller, $d'$, that forms one end of the curtain-roller $d$, as shown in Figs. 1, 2, and 3, by which arrangement the curtain is wound upon its roller $d$ when the shaft $f$ is rotated in one direction. The roller, drum, or pulley $d'$ is preferably made tapering, as shown in Fig. 1, so as to decrease the speed of the rotation of the curtain-roller $d$ in the ratio as the curtain is wound upon said roller, and vice versa, and thus cause the curtain to be raised and lowered with a uniform speed and motion. Where heavy curtains are used the tapering roller $d'$ is, as before stated, preferable, to compensate for the increase and decrease of the size of curtain-roller $d$ as the curtain is being wound on or off it. Where the curtain is very thin and light it may not be necessary to have the roller $d'$ tapering, and in such a case it may to equal advantage be made cylindrical.

The shaft $f$ is rotated by a mechanism as follows: To the said shaft $f$ is secured a drum or roller, $f^3$, from which leads a rope, belt, or chain, $k$, (endless or otherwise, as may be desired,) to the hoisting-drum $l$, the shaft of which is located and journaled in stationary bearings, as shown in Figs. 1 and 2. $l'$ is a crank secured to the shaft of the hoisting-drum $l$, by means of which the drum $l$ can be rotated.

At or near the stage-opening $a'$ I secure to the rear of the proscenium-wall $a$ the vertical bars $G'\ G''$, as shown, one or more at each of the vertical sides of said stage-opening, and such vertical bars or projections serve as stops to prevent the curtain-slat $e$ from being pushed outward with the curtain by drafts or pressure from the inside as may be caused by fire on the stage, &c., thus preventing the curtain from bulging out beyond the proscenium. By making the curtain of a suitable fire-proof material, and by arranging it and its slat $e$ combined with the stop ledges or bars $G'\ G''$, as described, a fire on the stage can easily be prevented from spreading to the auditorium simply by lowering the curtain.

By the arrangement of parts as described the curtain is at all times under the perfect control of the operator, who is enabled to raise or lower it at will more or less with great ease, and as no weighted stick, slat, or roller is used at the bottom of the curtain it can be raised quickly, while its accidental sudden drop and consequent liability to injure the occupants of the stage is avoided.

What I wish to secure by Letters Patent, and claim, is—

1. The curtain $c$, its roller $d$, and lower slat, $e$, combined with the shaft $f$ and its drums $f'$ $f''$, having ropes or chains $g'$ $g''$, leading, respectively, around guide-pulleys $h'$ $h''$, and having their ends secured to the slat $e$, and the rope or chain $i$, leading from a drum or roller on the shaft $f$ to a drum or roller, $d'$, on the curtain-roller, and means for imparting a reciprocating rotary motion to said shaft $f$, substantially as and for the purpose set forth.

2. The curtain $c$, its roller $d$, and lower slat, $e$, the intermediate shaft, $f$, with its drums $f'$, $f''$, and $f^3$, and the hoisting-drum $l$, combined with the rope or chain $k$, connecting the drums $l f^3$, the rope or chain $i$, connecting the drum $f''$ with the curtain-roller drum or pulley $d'$, and ropes or chains $g'$ $g''$, connecting the drums $f'$ $f''$ with the slat $e$ by the medium of the lower guide-pulleys, $h'$ $h''$, substantially as and for the purpose set forth.

In testimony whereof I have signed my name to this specification, in the presence of two subscribing witnesses, on this 31st day of December, A. D. 1887.

JOHN P. SMITH.

Witnesses:
EDWARD E. ROWELL,
WILLIAM H. BELKNAP.